Figure 1:
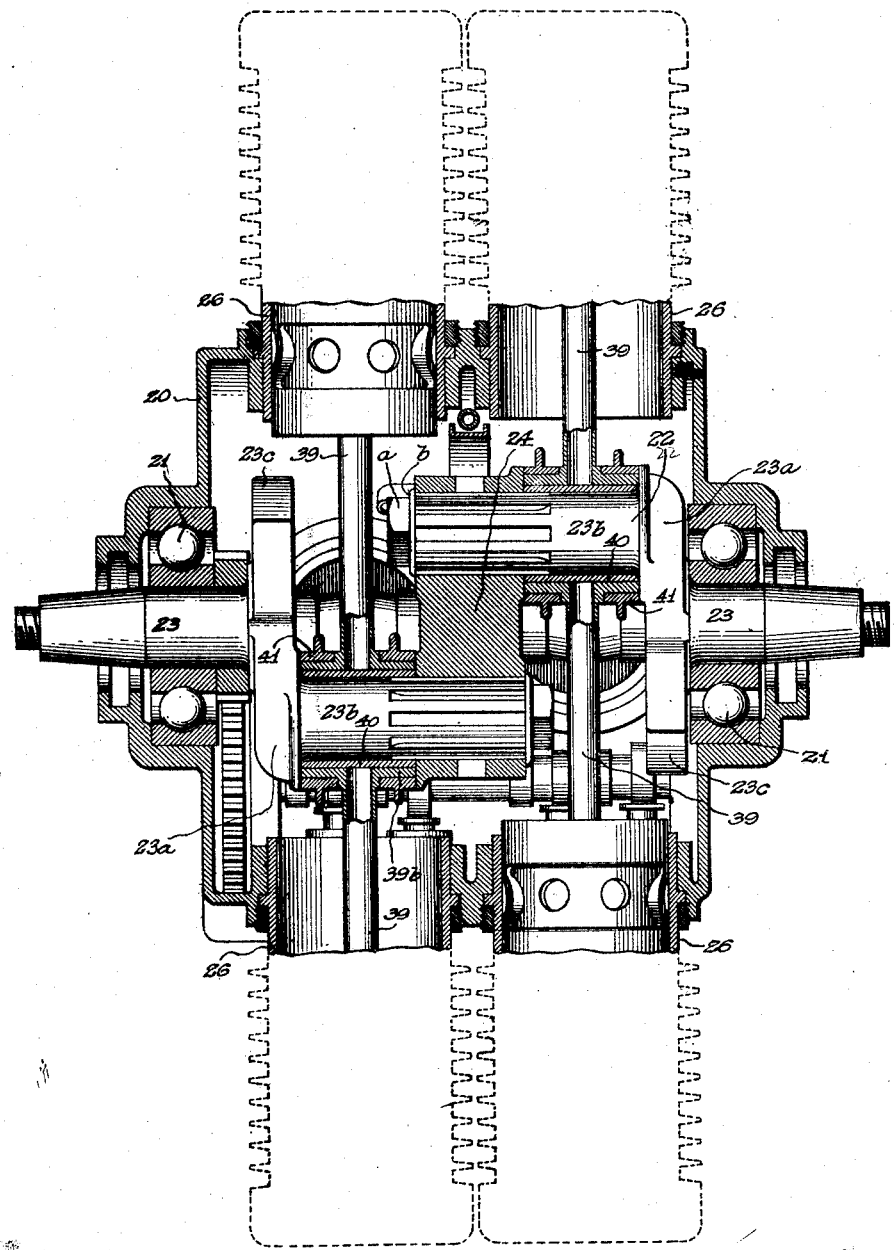

April 12, 1927.

H. FORD 1,624,228

CRANK SHAFT FORMATION

Original Filed Aug. 2. 1920    2 Sheets-Sheet 1

Inventor
Henry Ford,
By
Attorneys

April 12, 1927. H. FORD 1,624,228
CRANK SHAFT FORMATION
Original Filed Aug. 2, 1920  2 Sheets-Sheet 2

Inventor
Henry Ford,
By
Attorneys

Patented Apr. 12, 1927.

1,624,228

UNITED STATES PATENT OFFICE.

HENRY FORD, OF DEARBORN, MICHIGAN.

CRANK-SHAFT FORMATION.

Original application filed August 2, 1920, Serial No. 400,638. Divided and this application filed September 21, 1922. Serial No. 589,534.

This invention relates to improvements in crank shaft constructions, pertaining more particularly to constructions or formations designed for use in connection with internal combustion engines, being a division of the application filed by me August 2, 1920, Serial No. 400,638.

While the invention may be employed in various relations and in connection with internal combustion engines of general type, it is especially adapted and designed for use in connection with the type of internal combustion engine disclosed in the said parent application wherein the eight cylinders of the engine are arranged in two circular series of four cylinders each, the circular series being arranged side by side with the cylinders of one series aligned with those of the other series in the direction of the crank shaft axis, the cylinders of each series being symmetrically disposed relative to horizontal and vertical planes extending through the crank shaft axis and in the direction of the length of such axis, the arrangement being such that the axis of each cylinder practically bisects the angle between such planes, the cylinders thus being spaced apart an angular distance of approximately 90°, with the axes of the four cylinders of a series extending on the same plane, the latter intersecting the crank shaft axis at right angles.

This arrangement of cylinders practically sets up the requirement for the use of a two throw crank shaft, each series of cylinders having the cylinder pistons connected up to the same crank of the crank shaft.

In assembling an engine structure of this type, it is essential that the arrangement be such as to permit of ready assembly and taking apart to meet maintenance conditions, and the present invention is designed to take care of conditions of this kind by utilizing a composite crank shaft formation arranged in such manner as to permit not only of ready disassembling of the cylinder formations, but also ready removal of the connecting rod connections with the crank shaft so as to permit of individual replacement of connecting rods, etc., in a simple and efficient manner. An additional object is to provide a crank shaft construction that can be fabricated in a simple manner and which will, when properly assembled, provide for simple and efficient operation, durability in construction, and which can be produced at relative low cost of manufacture.

To these and other ends, therefore, the nature of which will be more readily understood as the invention is hereinafter disclosed, said invention consists in the improved construction and combination of parts hereinafter more particularly described, illustrated in the accompanying drawings, and more particularly pointed out in the appended claims.

Figure 2:
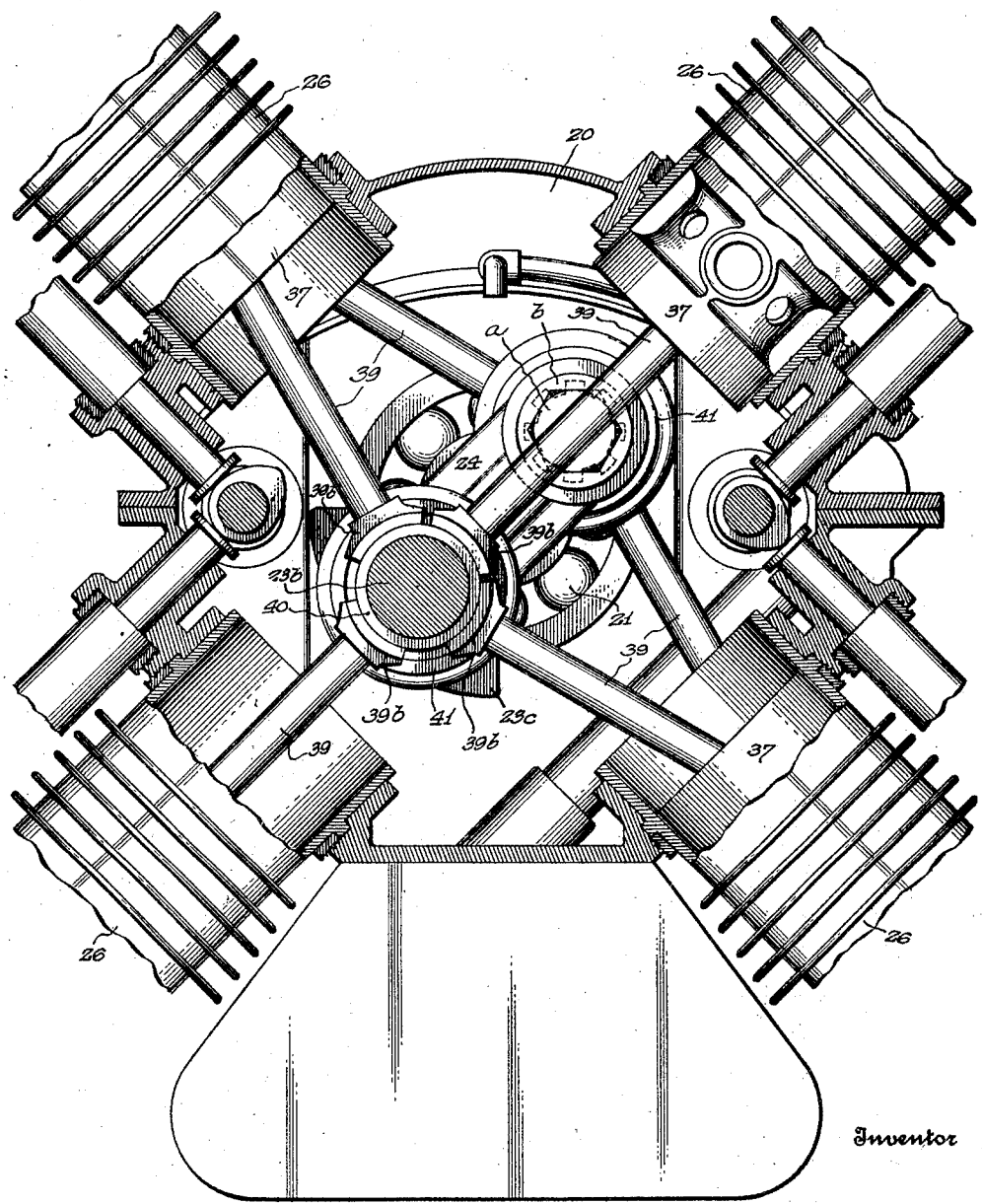

In the accompanying drawings in which similar reference characters indicate similar parts in each of the views, Fig. 1 is a sectional view of the crank shaft zone of an engine of the type disclosed in the said parent application, parts being shown in section, in elevation, and in outline, the structure being taken in the direction of length of the crank shaft axis;

Fig. 2 is a sectional view taken at right angles to Fig. 1.

In the drawings, the casing of the engine is indicated generally at 20, the cylinders at 26, the pistons at 37, and the connecting rod at 39, the latter having a shoe formation which permits the connecting rod to be mounted on the crank of the crank shaft. The drawings show additional features of the structure of the parent application, but those referred to bear more upon the structure of the present application. The relative arrangement of the cylinders of a circular series is shown in Fig. 2, while the arrangement of one series relative to the other is shown more particularly in Fig. 1, these figures showing that each of the two cranks of the crank shaft is operatively connected to all of the cylinders of a circular series and that the crank shaft arrangement is such as to permit the two series to be located in close juxtaposition. It may be noted that the engine casing is of sectional formation, the particular embodiment disclosed in the parent application dividing the casing on a horizontal plane extending through the crank shaft axis, an arrangement that permits the parts carried by the casing above such plane to be readily shifted for the purpose of substituting elements, etc.

The crank shaft, indicated generally at 22, is preferably of composite formation, being made up of two members 23 and a cheek member 24. As shown more particularly in Fig. 1, each member 23 is provided with a crank arm 23ª from which extends a crank pin 23ᵇ, the inner end of the pin being of a suitable spline formation adapted to cooperate with a complemental formation carried by the cheek member 24, the latter having its axis aligned with the axis of the crank shaft, the two crank pin structures being secured at opposite ends of the cheek member in suitable manner, the member 23 and cheek member 24, when thus assembled, producing a two-crank crank shaft capable of being disassembled when required by removal of the securing means for retaining the cheek member in position. As will be seen, the cheek member is located at the inner ends of each of the crank pins, the latter having a length sufficient to not only engage the cheek member but to provide for an intermediate portion to which the connecting rods of the cylinders are operatively connected.

Members 23 also preferably carry a suitable balancing weight 23ᶜ, this being shown as aligned with the crank arm 23ª of a crank shaft member. As indicated in Fig. 1, the crank shaft sections are mounted in suitable crank shaft ball bearing structures 21 located at opposite ends of the casing; these being positioned with their axes corresponding to the crank shaft axis.

In the particular embodiment shown, the cheek block and crank pin are secured in assembled relation by the use of a suitable member such as a headed screw $a$ and washer $b$, the latter being located on the shank of the screw, the screw extending into the crank pin, the washer overlying a face of the cheek block, so that the pin and cheek block are held against relative movement in the direction of the pin axis, the complemental spline formation of the pin and cheek block serving to prevent relative movement of the pin within the cheek block.

The connecting rods are shown as tubular, with the inner ends in the form of a shoe 39ᵇ—shown as integral but which may obviously be a secured structure—the shoe being extended laterally so as to project between a bushing 40, mounted on crank pins 23ᵇ and a pair of annular collars 41 located on opposite sides of the rod, the shoe having a length in the direction of the crank shaft travel greater than the diameter of the connecting rod, but less than the distance corresponding to an angular distance of 90° of the bushing. The approximate length of the shoe is shown more particularly in Fig. 2, the arrangement being such as to permit the inner ends of the four connecting rods, the shoes of which are so mounted on a crank pin, to move relatively to each other as the pin travels in its orbit, the arrangement permitting proper compensation in the change in angularity of the connecting rod as various piston strokes are produced.

By the general arrangement shown, it will be readily understood that assembly and repair and replacement of the parts can be readily had by reason of the ability to disconnect the cheek member 24 from the crank pin. This can be done by first removing the upper section of the casing with the upper cylinders, thus exposing the crank shaft formation and the pistons attached thereto by the formation which secured the inner end of the rods to bushing 40. The crank shaft is then raised a distance sufficient to permit lateral shifting of one of the members 23, after which the cap screw or other securing means for the cheek member mounted in the member 23 which carries the connecting rod structure which is being replaced or repaired, is removed, thus permitting the member 23 to be withdrawn from the bushing, leaving the connecting rod shoe still positioned on the bushing. One of the collars 41 may then be removed, permitting the connecting rod to be shifted out of position without affecting the remaining rods, after which the substitute rod is placed in position, the collar replaced, thus restoring the general connection between the series of the connecting rods and the bushing, after which member 23 is replaced, securing means restored, the crank shaft returned to the proper position and the upper section restored. This is made possible not only by reason of the fabricated form of connecting rod but also by reason of the use of the bushing 40 which retains the assembly of connecting rod shoes in their general arrangement even through crank shaft member 23 be removed, so that in assembling or taking out the connecting rod structure there is no disturbance of general arrangements, it being possible to assemble the four piston structures on the bushing in advance of the introduction of the crank pin into the bushing; and this same assembly remains, of course, when the crank pin is withdrawn to permit access to the collars 41.

As will be seen, the members 23 are substantially duplicated, and have a formation that can be readily fashioned and is of a form that lends itself to production under high capacity conditions. Similarly, the cheek block is of simple formation, so that the entire crank shaft structure is one that can be readily utilized in an engine of this general type or under conditions more or less analogous to service of this kind.

While I have herein shown and described a preferred embodiment of the invention, it will be readily understood that changes and modifications therein may be found desirable or essential in meeting the various exigencies of use, and I desire to be understood as reserving the right to make any and all such changes or modifications as may be found desirable or necessary in so far as the same may fall within the spirit and scope of the invention as expressed in the accompanying claims when broadly construed.

Having thus fully described my invention, what I claim as new is:—

1. In crank shafts for internal combustion engines, a pair of end members of similar formation, each member having a journal member and a pin offset with respect to the journal axes and extending in the opposite direction to that of the journal, the pin being of greater length than the axial length of the connecting rod assembly with which the pin co-operates, a member removably carried by and connecting the free ends of the pins to produce a two-throw crankshaft assembly, with the connecting member of a thickness corresponding to the excess length of either pin, the member having an opening for each pin extending throughout the thickness of the member, the wall of each opening and the pin portion which extends therethrough having complemental means for maintaining the member openings-and-pin assembly against relative movement rotatively, and means carried by and extending axially of the pin for preventing movement of the connecting member in a direction to release the member from the pin, movement of the member on a pin in the opposite direction being prevented by the connecting rod assembly, whereby the member is held from applying bending strains on a pin through relative movement of pin and the member.

2. A crank shaft formation as in claim 1 characterized in that the retaining means is in the form of a threaded member inserted in the end of the pin and having a washer formation designed to overlie the outer face of the connecting member, the pin and connecting member having relative formations to prevent turning movement of the member on the pin.

In testimony whereof I affix my signature.

HENRY FORD.